United States Patent
Bennington et al.

(10) Patent No.: US 6,221,120 B1
(45) Date of Patent: Apr. 24, 2001

(54) CLEANABLE SCREEN GUARD FOR FIN-COIL HEAT EXCHANGERS

(76) Inventors: Gary C. Bennington, 700 S. 15th St., Manhattan; Wilse E. Crain, 307 S. 6th St., Marysville; Dwight A. Hamilton, 420 Osage St; Gary Mark Smith, 6280 Zeandale Rd., both of Manhattan, all of KS (US) 66502

( * ) Notice: Subject to any disclaimer, the term of this patent is extended or adjusted under 35 U.S.C. 154(b) by 0 days.

(21) Appl. No.: 08/845,330

(22) Filed: Apr. 25, 1997

(Under 37 CFR 1.47)

(51) Int. Cl.[7] .................................................. B01D 39/12
(52) U.S. Cl. ......................... 55/385.1; 55/496; 55/500; 55/511; 55/525; 62/259.1; 62/507
(58) Field of Search ............................ 55/490, 491, 495, 55/496, 501, 507, 511, DIG. 31, 525, 509, 385.3, 500, 385.1; 62/259.1, 262, 507

(56) References Cited

U.S. PATENT DOCUMENTS

| | | | | |
|---|---|---|---|---|
| 1,755,370 | * | 4/1930 | Smith | 55/385.3 |
| 3,344,854 | * | 10/1967 | Boyajian | 55/385.3 |
| 4,125,147 | * | 11/1978 | Bailey | 55/385.3 |
| 4,961,849 | | 10/1990 | Hull et al. . | |
| 5,097,678 | | 3/1992 | Aubuchon . | |
| 5,156,662 | | 10/1992 | Downing et al. . | |
| 5,687,689 | * | 11/1997 | Santos | 55/490 |
| 5,689,969 | * | 11/1997 | Conroy | 55/490 |
| 5,809,800 | * | 9/1998 | Deal | 62/507 |

* cited by examiner

Primary Examiner—David A. Simmons
Assistant Examiner—Robert A. Hopkins
(74) Attorney, Agent, or Firm—Joseph B. Bowman; Shook, Hardy & Bacon

(57) ABSTRACT

A screen guard is utilized to protect fin coils of a fin-coil heat exchanger of an apparatus such as a heat pump or air conditioner. The screen guard prevents cottonwood seeds and other debris capable of forming a filter from obstructing the air flow over the fin coils. The screen guard comprises a wide mesh screen member and an adhesive attachment strip. The attachment strip may be magnetic so that it attaches directly to a ferrous housing of the apparatus. Alternatively, a VELCRO® fastener strip is fixed to the apparatus and the attachment strip is a complimentary VELCRO® strip which removably attaches to the fastener strip. The screen guard can be repeatedly removed and reattached for cleaning debris from the screen guard. A method of protecting the apparatus includes removing the screen guard for cleaning and thereafter reattaching the screen guard.

8 Claims, 2 Drawing Sheets

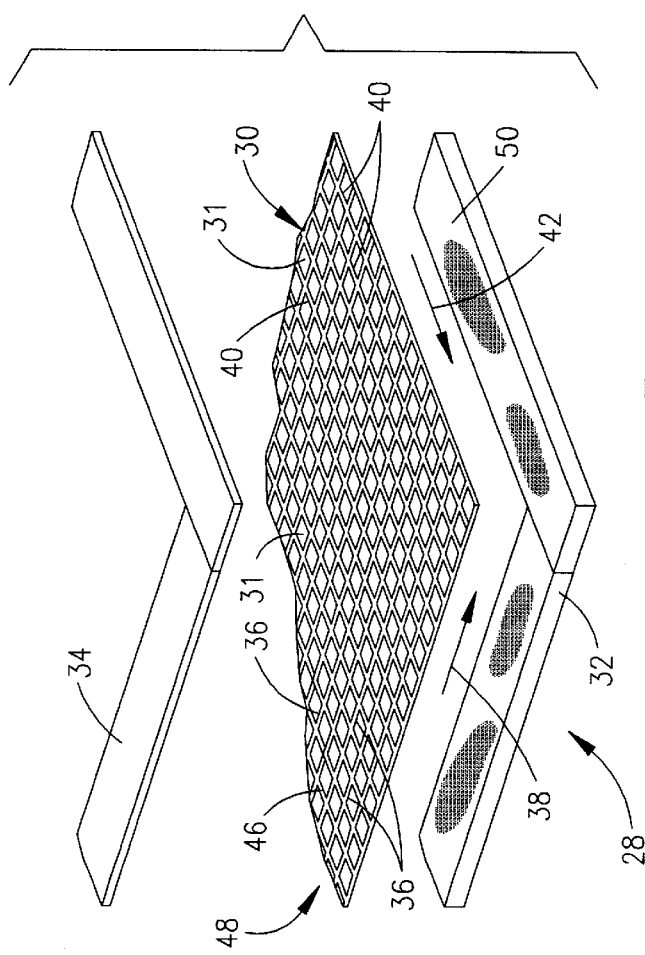
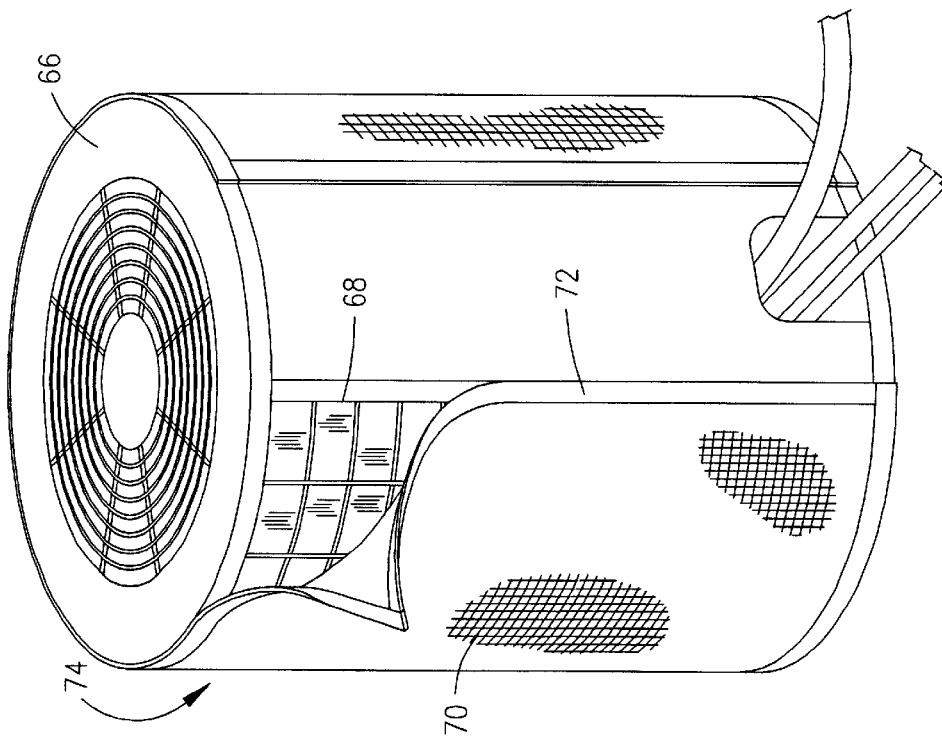

CLEANABLE SCREEN GUARD FOR FIN-COIL HEAT EXCHANGERS

BACKGROUND OF THE INVENTION

This invention relates to a screen guard for protecting a heat exchanger and, more particularly, to an easily removable and cleanable screen guard for a fin-coil heat exchanger to capture cottonwood seed.

Fin-coil heat exchangers are commonly used in split system air conditioners, heat pumps, refrigeration systems, and the like. These devices frequently use a fan to force air to flow over fin coils. The fin coils of these heat exchangers are thin, closely spaced flanges of metal over which air travels to carry heat away from the flanges and hence the heat exchanger. A primary reason for the failure of fin-coil heat exchangers and their components is obstruction of air flow through the fin coils.

While small debris such as dust and dirt can pass through the fin coils, large debris can obstruct air flow through the fin coils. Cottonwood seeds in particular present a significant problem. Cottonwood trees release seeds which open to expose a tuft of fibrous material with many strands extending from the husk of the seed. As an air conditioner operates, it draws air and cottonwood seeds into the heat exchanger. Fibers of the cottonwood seeds become entangled in the thin, closely spaced fin coils of the heat exchanger and eventually impede air flow through the coils. Even more significantly, fibers of cottonwood seeds bridge the narrow openings between fin coils to create a filter media which collects dust and dirt that would normally pass between the fin coils. Dust and dirt accumulate on the filter media formed by cottonwood seeds further impeding air flow and ultimately plugging the narrow openings between the fin coils. Thus, cottonwood seeds impede air flow eventually causing the heat exchanger to fail requiring expensive repair or replacement.

Once cottonwood seeds are caught in the fin coils, they are not easily removed. Spraying the fin coils with water to remove cottonwood seeds is time consuming and generally fails in removing cottonwood seeds. Further, the undesirable tendency of cottonwood seed tufts to collect dust and dirt is intensified by moisture. Physically removing the cottonwood seeds with a wire brush, for example, is an even more time consuming task and can damage the fin coils.

U.S. Pat. Nos. 5,156,662 to Downing et al and 4,961,849 to Hull et al disclose filtering assemblies utilizing standard furnace filter material and spun glass/fiber glass screen respectively. While the Hull reference purportedly proposes a filter for any application, the Downing reference proposes an exterior filter system to cover a housing of an air conditioning system to prevent dirt and debris from passing through to the heat exchanger. However, these filters, which are capable of filtering dust and dirt, significantly reduce air flow through the heat exchanger, and reduced air flow degrades the efficiency of the air conditioning system. To compensate, the fan speed is increased thereby increasing power consumption and operating cost. As the filter becomes clogged with dust, dirt, and cottonwood seeds the air flow through the heat exchanger is further reduced thereby degrading efficiency. Therefore, simply providing a filter for the heat exchanger does not provide a satisfactory solution to the cottonwood seed problem outlined above.

The Downing reference proposes attaching the filter to the air conditioning unit with a group of straps and rings which are attached to the perimeter of the filter. While the straps and rings function to satisfactorily attach the filter, it is somewhat time consuming to thread each strap through a corresponding ring to attach the filter, and thus, the filter assembly of Downing discourages removing the filter for cleaning or replacement. Further, the straps and rings limit the versatility of the filter requiring different length straps that are positioned in different locations around the perimeter of the filter for different air conditioners, and attaching the straps and rings also complicates and increases the cost of manufacturing the filter.

The Hull reference attaches a filter to an intake air vent of a car with a magnetic frame that is connected to the perimeter of the filter. Thus, the Hull reference provides a filter that is quickly and easily attached and reattached when ferrous metal is available for the magnetic frame to attach to. However, the use of non metallic materials and nonferrous metals is increasing, and the Hull reference does not provide a solution for convenient attachment to such materials. Further, the Hull reference does not specifically address how filters can be attached to heat exchangers.

Thus, preventing the accumulation of cottonwood seed and similar filter forming debris on fin coils of a heat exchanger and maintaining a high air flow rate through the heat exchanger are desirable to extend the life and enhance the efficiency of the heat exchanger. Further, providing a simply manufactured and versatile cleanable screen guard with quick and easy means for attachment to any material is desirable to reduce manufacturing cost, increase the rate of manufacture, encourage frequent cleaning, and reduce the time spent detaching and reattaching the screen guard for cleaning.

BRIEF SUMMARY OF THE INVENTION

There is, therefore, provided in one embodiment of the invention a novel cleanable screen guard for protecting a fin-coil heat exchanger from cottonwood seeds and other filter forming debris. The screen guard is removably secured to an apparatus utilizing a fin-coil heat exchanger and covers an air inlet of the fin-coil heat exchanger with a wide mesh screen member to prevent obstruction of the fin coils without restricting air flow through the heat exchanger. Openings in the screen member are sized to prevent substantially all cottonwood seeds from passing therethrough and allow the cottonwood seeds to be easily removed during cleaning.

A flexible attachment strip is fixed to the perimeter of the screen member. The flexible attachment strip is preferably magnetic and is therefore capable of removably securing the screen guard to a ferrous metal housing of the apparatus utilizing the heat exchanger. Because of the magnetic attachment strip, the screen guard is quickly and easily removed for cleaning and is quickly and easily reattached afterward.

When a ferrous metal housing is unavailable, an alternate embodiment of the invention provides a fastener strip unremovably affixed to the apparatus, so that it surrounds an air inlet of the heat exchanger. In this embodiment the fastener strip and attachment strip are either both VELCRO® or both magnetic, so that the attachment strip is removably secured to the fastener strip.

Accordingly, it is an object of the present invention to provide an improved screen guard for protecting a fin-coil heat exchanger from cottonwood seeds and other filter forming debris while allowing small debris such as dust and dirt to pass through the heat exchanger.

It is a further object of the present invention to provide an improved screen guard that is quickly and easily removed and reattached to encourage cleaning.

It is a still further object of the present invention to provide an improved screen guard that is quickly and easily cleaned.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 3 is a perspective view of an apparatus having a differently configured housing to illustrate the flexibility of the cleanable screen guard; and FIG. 4 is a fragmentary exploded view of the cleanable screen guard of FIG. 1.

DETAILED DESCRIPTION OF THE PREFERRED EMBODIMENTS

Figure 1:
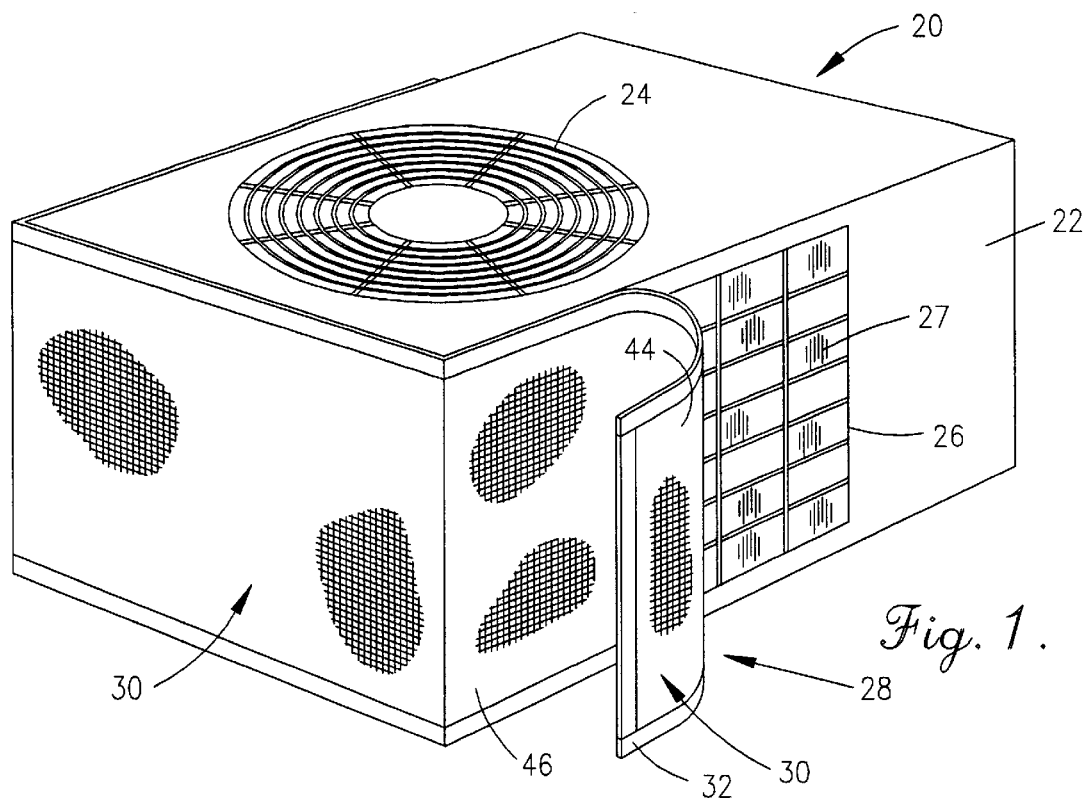
FIG. 1 is a perspective view of an apparatus having a fin-coil heat exchanger utilizing a cleanable screen guard according to the present invention to protect the fin-coil heat exchanger.

Referring to the drawings in greater detail, FIG. 1 shows an apparatus 20 such as an air conditioner or heat pump which utilizes a high air flow fin-coil heat exchanger having many fin coils 27. The apparatus has a housing 22 which defines an air outlet 24 and an air inlet 26. A fan (not shown) operates to draw air in through the air inlet across the fin coils and exhaust the air through the air outlet. To prevent filter forming debris such as cottonwood seeds and the like from entering through the air inlet 26 and covering the fin-coils 27, a cleanable screen guard, generally designated 28, covers the air inlet 26. Referring additionally to FIG. 4, the screen guard comprises a single layer screen member, generally designated 30, an attachment strip 32 fixed to the screen member, and an adhesive tape 34 fixed to the screen member opposite the attachment strip. As illustrated in FIG. 4, the screen member 30 is "sandwiched" between the attachment strip and the adhesive tape.

The screen member 30 is made from a flexible, UV resistant, corrosion resistant, non-metallic, and weather resistant composite material. The screen member has a first plurality of filaments 36 extending in a first direction illustrated by arrow 38 and a second plurality of filaments 40 extending in a second direction illustrated by arrow 42. The first filament direction is transverse to the second filament direction, so that the first plurality of filaments intersects the second plurality of filaments creating openings 31 therebetween. Preferably, the filament directions are substantially perpendicular.

The openings are sized to both prevent substantially all cottonwood seeds from passing through the screen member and allow the cottonwood seeds to be easily removed during cleaning. Further, the screen member does not substantially reduce the air flow rate through the heat exchanger and allow dust and dirt to pass through. To that end, the screen member 30 is wide mesh or coarse and has less than 16 filaments per inch in each of the filament directions 38, 42. Specifically, there are less than 16 first plurality filaments 36 in an inch measured along the second direction 42, and there are less than 16 second plurality filaments 40 in an inch measured along the first filament direction 38. In a preferred embodiment, there are 8 filaments per inch in one direction and 9 filaments per inch in the other. The screen member has an attachment side 44 which faces the apparatus 20 and an outward side 46 which faces away from the apparatus.

The attachment strip 32 is also flexible, and it attaches to the perimeter, generally designated 48, of the attachment side 44 of the flexible screen member 30. Like the screen member, the attachment strip should also be UV resistant, corrosion resistant, non-metallic, and weather resistant. The attachment strip is approximately one inch wide and is preferably backed with an adhesive applied to an adhesive side 50. The adhesive side of the attachment strip is applied to the attachment side 44 of the screen member 30 thereby securing the attachment strip to the screen member. In this manner, the screen member 30 is attached outside of the attachment strip 32. That is, the screen member is farther away from the apparatus 20 than the attachment strip. In the preferred embodiment shown, a strip of weather resistant vinyl tape 34 is placed on the outward side 46 of the screen member opposite the attachment strip. The adhesive side of the tape faces the adhesive side 50 of the attachment strip. The adhesive tape further secures the attachment strip to the screen member by protecting the adhesive on the attachment strip and applying additional adhesive to the connection. Thus, the tape is a connection reinforcement member.

The attachment strip is preferably continuous and extends around the entire perimeter of the screen member. However, the attachment strip may be discontinuous, and it may be omitted entirely from the bottom portion of the screen member for use in a calm weather environment without high winds. Because the housings of most apparatuses 20 are ferrous, the attachment strip is preferably magnetic. Thus, the magnetic attachment strip is removably secured to the housing 22 by magnetic forces.

This screen guard is easily and quickly assembled. It requires no stitching or other mechanical attachment between the attachment strip and the screen member. Thus, the method of manufacture requires no tools other than a cutting instrument, and there is no structure such as stitches to interfere with the magnetic connection between the attachment strip and the housing.

Figure 2:
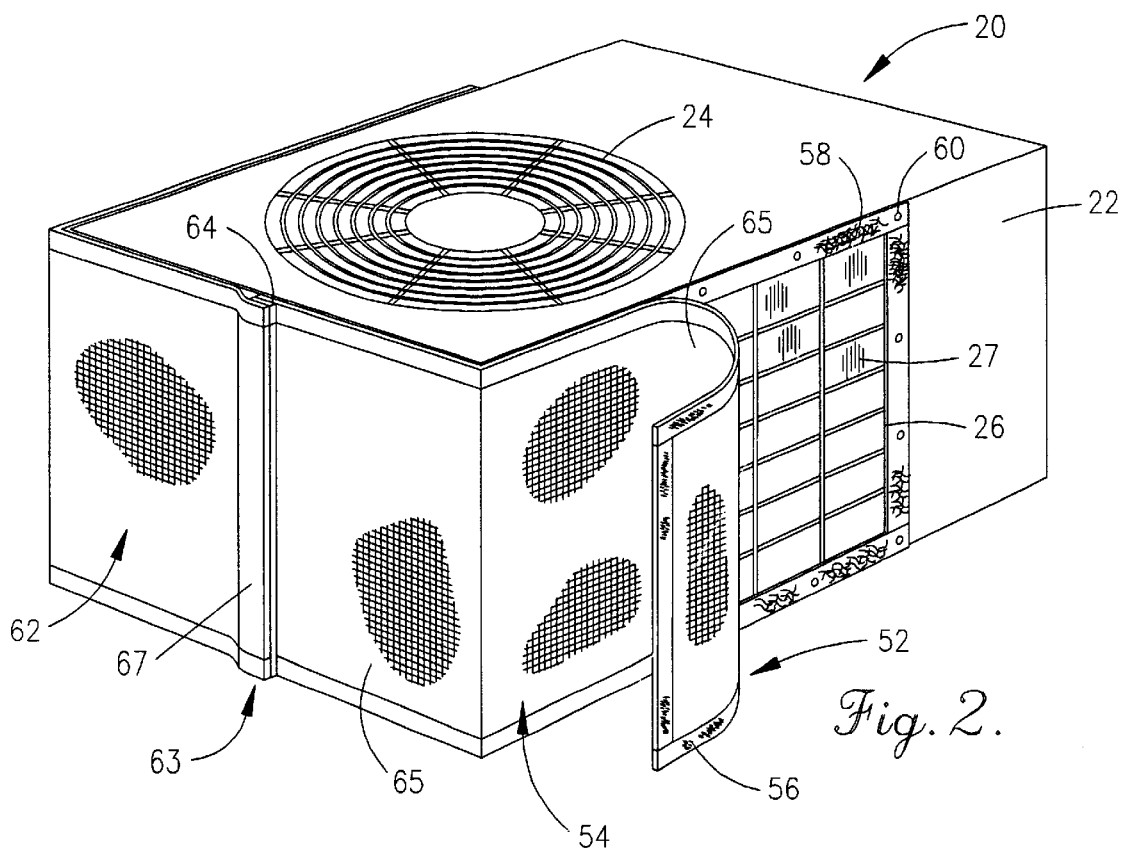
FIG. 2 is a perspective view of an apparatus having a fin-coil heat exchanger utilizing an alternate embodiment of a cleanable screen guard according to the present invention.

FIG. 2 illustrates an alternate embodiment in which identical reference numerals will be used for identical components. FIG. 2 shows the apparatus 20 having the housing 22 defining the air outlet 24 and air inlet 26. The fan (not shown) draws air in through the air inlet over exposed fin coils 27 of the fin-coil heat exchanger and exhausts the air from the air outlet. A screen guard 52 has a screen member 54 with an attachment strip 56 around the perimeter thereof. In this embodiment, a fastening strip 58 is unremovably affixed to the housing 22 of the apparatus 20 by fasteners 60 or an adhesive. The fastener strip is preferably continuous and surrounds the entire perimeter of the inlet of the housing. Thus, the fastener strip is affixed to the housing in a position and with a configuration corresponding to the size and configuration of the air inlet 26. The screen member and attachment strip 56 are configured to match the fastener strip 58. The attachment strip around the perimeter of the screen member is then removably secured to the fastener strip thereby covering the air inlet with the screen guard. The fastener strip is unremovably connected to the housing in that removal would involve a labor intensive process which might result in the partial destruction of the fastener strip. The attachment strip is removably secured to the fastener strip in that it may be easily removed by pulling the attachment strip away from the fastener strip.

In this embodiment, the fastener strip and the attachment strip form cooperative strips of a hook and loop fastener system commonly known as VELCRO®. The loop portion is preferably applied to the screen member as the attachment strip. The VELCRO® attachment strip can be connected to the screen member by means of the adhesive disclosed in conjunction with the embodiment of FIG. 1 or with mechanical means such as stitching or staples. Utilizing the fastener strip allows the screen guard to be applied to an apparatus with a non-ferrous housing. The above-described magnetic attachment strip may also be utilized with a non-ferrous housing by attaching a magnetic fastener strip to the housing, as described in accordance with the embodiment of FIG. 2. In such an embodiment, the attachment strip and fastener strip would form cooperative magnetic strips.

The embodiment shown in FIG. 2 also illustrates a second screen guard 62 used in conjunction with the first screen guard 54 to cover the entire air inlet area of the housing. This creates a seam, generally designated 63, between the two screen guards. To connect the two screen guards, a VELCRO® connection strip 64 is applied to the outward side 65 of the edge of one of the two screen guards. In the illustrated embodiment, the connection strip is applied to the outward side edge of the first screen member 54, and thus, the attachment strip 67 along the corresponding edge of the second screen guard is removably secured to the connection strip to form the seam 63.

The screen guard may be manufactured in various sizes and shapes to cover air inlets for various apparatuses such as shown in FIG. 3. In FIG. 3, the apparatus 66 is circular and has a tall air inlet 68. The flexible screen member 70 and flexible attachment strip 72 form a flexible screen guard 74 which easily matches the circular contour of the apparatus 66.

In operation of both embodiments, the fan draws air in through the screen guard 28, 54 and air inlet 26 over the fin coils 27 and exhausts the air through the air outlet 24 of the housing 22. For efficient operation, the air flow rate through the housing and over the fin coils must be high. Filter forming debris such as cottonwood seeds can clog the fin coils thereby reducing air flow through the housing and preventing air from flowing over the fin coils adjacent the debris. With the screen guard in place, cottonwood seeds strike the screen member and are prevented from passing through the screen member to the fin coils. Smaller debris such as dust and dirt is allowed to pass through the screen guard. Thus, smaller debris is simply carried through the housing by the high air flow. The preferred embodiment of the screen member with a wide mesh of 8 by 9 filaments per inch has been found ideal to prevent substantially all cottonwood seeds from passing through the screen guard while allowing smaller debris to pass through the apparatus without substantially reducing air flow. Therefore, the screen guard allows sufficient air flow through the apparatus for efficient operation while preventing clogging of the fin coils.

Once the screen guard has become partially obstructed with debris, it is easily removed for cleaning or replacement by pulling the attachment strip away from the housing in the embodiment of FIG. 1 or away from the fastener strip in the embodiment of FIG. 2. The wide mesh of the screen member allows the debris to be removed by simply shaking the screen or brushing the debris from the screen. It is not necessary to use compressed air, pressurized water, or otherwise wash the screen guard. After the screen guard has been cleaned, it is easily reapplied by reattaching the attachment strip to the housing or to the fastener strip as appropriate.

In comparison tests actually conducted, three prototype materials were tested: 1) standard bonded fiber filter of one inch thickness, i.e. a furnace filter, 2) fiberglass window screen with a spacing of approximately 16 by 17 filaments per inch, and 3) wide mesh screen with a spacing of approximately 9 by 8 filaments per inch. Each heat exchanger was tested without a prototype in place to obtain a control measurement for air flow. Then, each prototype was tested in succession on four heat exchanger units. All tests were five minutes long, and a single set of new refrigeration gauges was used in all tests to ultimately compare air flow rates between the three prototypes. Prototypes 1 (one) and 2 (two) resulted in nearly equivalent reductions in air flow over the five minute tests, and both prototypes 1 (one) and 2 (two) satisfactorily prevented cottonwood from reaching the heat exchanger. Prototype 1 (one), however, was unsatisfactory because it was impossible to remove cottonwood seeds from the filter. Prototype 3 (three) resulted in only a small if not negligible reduction in air flow while still preventing substantially all cottonwood sees from passing therethrough. Further, the cottonwood seeds were easily removed from prototype 3 (three) during cleaning. Because prototype 3 (three) only negligibly reduced air flow, caught substantially all cottonwood seeds, and was easy to clean, prototype 3 (three) is preferred over prototype 2 (two).

Manufacturing the screen guard requires no skilled labor and no tools other than cutting instruments, and therefore, it is inexpensively, easily, and quickly manufactured. The screen guard of the present invention can be secured to an apparatus without regard to the size or configuration of the apparatus. Further, two screen guards can be combined to cover larger air inlets. Thus, the cleanable screen guard is versatile. The attachment strip is quickly and easily secured to and removed from the apparatus (FIG. 1) or fastening strip (FIG. 2), and once removed the screen guard is quickly cleaned without dragging a water hose to the apparatus. Thus, the screen guard reduces the time required for and difficulty of cleaning thereby encouraging frequent cleaning. Affixing the fastener strip to the apparatus does require time and labor, but once it is affixed, the screen guard is just as easily and quickly removed and reattached as in the embodiment of FIG. 1. The screen guard provides an effective protection from cottonwood seeds without substantially reducing air flow, and therefore, the screen guard extends the life and enhances the efficiency of fin-coil heat exchangers.

From the foregoing it will be seen that this invention is one well adapted to attain all ends and objects hereinabove set forth together with the other advantages which are obvious from and which are inherent to the structure.

It will be understood that certain features and subcombinations are of utility and can be employed without reference to other features and subcombinations. This is contemplated by and is within the scope of the claims.

Since many possible embodiments can be made of the invention without departing from the scope thereof, it is to be understood that all matter herein set forth or shown in the accompanying drawings is to be interpreted as illustrative and not in a limiting sense.

What is claimed is:

1. A removable and cleanable screen guard for protecting a fin-coil heat exchanger from filter forming debris consisting essentially of cottonwood seeds without restricting an air flow rate through the fin-coil heat exchanger, the screen guard comprising:

a flexible, wide mesh screen having a perimeter, an attachment surface an outward surface, a first plurality of filaments extending in a first filament direction, a second plurality of filaments extending in a second filament direction transverse to the first filament direction, the first plurality of filaments intersecting the second plurality of filaments to create openings therebetween, wherein there are approximately eight filaments per inch in the first filament direction, and approximately nine filaments per inch in the second filament direction, the opening being sized to prevent substantially all cottonwood seeds from passing through the openings and being sized to permit substantially all dirt and dust to pass freely through the openings, and a flexible attachment strip fixed directly to the attachment surface of the flexible screen around substantially the entire perimeter for removably securing the perimeter of the screen to the fin-coil heat exchanger.

2. The screen guard according to claim 1 wherein the openings are sized to allow easy removal of cottonwood seeds during cleaning.

3. The screen guard according to claim 1 wherein the attachment strip comprises a magnetic adhesive backed attachment strip having adhesive applied to an adhesive side, and the adhesive fixing the attachment surface of the screen member to the adhesive side of the attachment strip.

4. The screen guard according to claim 3 further comprising an adhesive tape attached to the outward surface of the screen member opposite the attachment strip such that the perimeter of the screen is between the attachment strip and the adhesive tape.

5. The screen guard according to claim 1 further comprising a fastener strip unremovably connected to a housing of the fin-coil heat exchanger and surrounding the air inlet of the fin-coil heat exchanger; and wherein the attachment strip is removably securable to the fastener strip.

6. The screen guard according to claim 5 wherein the fastener strip comprises a VELCRO strip, and the attachment strip comprises a complementary VELCRO strip for attaching the attachment strip to the fastener strip.

7. The screen guard according to claim 5 wherein the fastener strip comprises a magnetic strip, and the attachment strip comprises a complementary magnetic strip for attaching the attachment strip to the fastener strip.

8. The screen guard according to claim 1, further comprising a connection strip fixed to an edge of the outward surface for connecting to another screen guard.

* * * * *